(12) United States Patent
Taguchi (10) Patent No.: US 10,447,887 B2
(45) Date of Patent: Oct. 15, 2019

(54) TERMINAL AND COMPUTER READABLE MEDIUM STORING PROGRAM FOR OUTPUTTING OUTPUTTABLE FILES

(71) Applicant: FUJI XEROX CO., LTD., Tokyo (JP)

(72) Inventor: Maki Taguchi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/216,280

(22) Filed: Jul. 21, 2016

(65) Prior Publication Data

US 2017/0280002 A1    Sep. 28, 2017

(30) Foreign Application Priority Data

Mar. 25, 2016    (JP) .................................. 2016-061561

(51) Int. Cl.
*H04N 1/32*    (2006.01)
*H04N 1/00*    (2006.01)
*G06F 3/12*    (2006.01)

(52) U.S. Cl.
CPC ....... *H04N 1/32101* (2013.01); *G06F 3/1204* (2013.01); *G06F 3/126* (2013.01); *G06F 3/1236* (2013.01); *G06F 3/1253* (2013.01); *G06F 3/1292* (2013.01); *H04N 1/00307* (2013.01); *H04N 2201/0041* (2013.01); *H04N 2201/0055* (2013.01)

(58) Field of Classification Search
CPC ........... H04N 1/32101; H04N 1/00307; H04N 2201/0055; H04N 2201/0041
See application file for complete search history.

(56) References Cited

U.S. PATENT DOCUMENTS

| | | | | |
|---|---|---|---|---|
| 6,504,621 | B1* | 1/2003 | Salgado | G06F 3/1285 358/1.1 |
| 9,250,844 | B2 | 2/2016 | Hiroki | |
| 2003/0063198 | A1 | 4/2003 | Yokokawa | |
| 2003/0231345 | A1* | 12/2003 | Azami | G06K 15/02 358/1.18 |
| 2005/0071495 | A1* | 3/2005 | Kadota | G03G 15/55 709/232 |
| 2005/0275860 | A1* | 12/2005 | Nagarajan | H04N 1/00954 358/1.13 |

(Continued)

FOREIGN PATENT DOCUMENTS

| | | |
|---|---|---|
| EP | 2852135 A1 | 3/2015 |
| JP | 2009-251823 A | 10/2009 |
| JP | 2013-012111 A | 1/2013 |

OTHER PUBLICATIONS

Rahul Seigel, "How to Easily View Recently Modified Files in Windows", Jun. 13, 2015 https://www.howtogeek.com/219157/how-to-easily-view-recently-modified-files-in-windows/ hereinafte.*

(Continued)

*Primary Examiner* — Ming Y Hon
(74) *Attorney, Agent, or Firm* — Oliff PLC (57) ABSTRACT

A terminal includes: an extraction unit that extracts output target candidates from a plurality of files included in the terminal; a display that displays the extracted candidates; a receiving unit that receives a selection of an output target from the displayed candidates; and an output unit that outputs the selected output target.

11 Claims, 6 Drawing Sheets

(56) References Cited

U.S. PATENT DOCUMENTS

| | | | |
|---|---|---|---|
| 2006/0007480 A1* | 1/2006 | Yokokura | G06F 3/1204 358/1.15 |
| 2006/0012564 A1* | 1/2006 | Shiozawa | G06F 1/1626 345/156 |
| 2006/0053167 A1* | 3/2006 | Yamada | G06F 17/30244 |
| 2006/0119887 A1* | 6/2006 | Aritomi | G06F 3/1207 358/1.15 |
| 2008/0046457 A1* | 2/2008 | Haub | G06F 17/30997 |
| 2008/0177755 A1* | 7/2008 | Stern | G06F 21/568 |
| 2009/0037407 A1* | 2/2009 | Yang | G06Q 10/107 |
| 2009/0244594 A1* | 10/2009 | Nuggehalli | G06F 21/608 358/1.15 |
| 2010/0195155 A1* | 8/2010 | Gustafson | G06Q 10/06 358/1.15 |
| 2011/0043857 A1 | 2/2011 | Hiroki | |
| 2012/0033262 A1* | 2/2012 | Sakurai | G06F 1/1694 358/1.15 |
| 2013/0003105 A1* | 1/2013 | Yamada | G06K 15/1859 358/1.14 |
| 2013/0016405 A1* | 1/2013 | Tsutsumi | H04N 1/32128 358/403 |
| 2014/0002853 A1* | 1/2014 | Miyata | H04N 1/00482 358/1.15 |
| 2014/0351748 A1* | 11/2014 | Xia | G06F 3/0481 715/798 |
| 2014/0355059 A1* | 12/2014 | Asai | G06F 3/1212 358/1.15 |
| 2015/0055171 A1* | 2/2015 | Joo | G06F 3/00 358/1.15 |
| 2016/0103646 A1 | 4/2016 | Hiroki | |
| 2016/0269577 A1* | 9/2016 | Sato | H04N 1/00307 |

OTHER PUBLICATIONS

Aug. 24, 2017 Extended European Search Report issued in European Patent Application No. 16185209.0.

* cited by examiner

TERMINAL AND COMPUTER READABLE MEDIUM STORING PROGRAM FOR OUTPUTTING OUTPUTTABLE FILES

CROSS-REFERENCE TO RELATED APPLICATIONS

This application is based on and claims priority under 35 USC 119 from Japanese Patent Application No. 2016-061561 filed on Mar. 25, 2016.

BACKGROUND

Technical Field

The present invention relates to a terminal and a computer readable medium storing a program.

SUMMARY

According to an aspect of the invention, there is provided a terminal comprising: an extraction unit that extracts output target candidates from a plurality of files included in the terminal; a display that displays the extracted candidates; a receiving unit that receives a selection of an output target from the displayed candidates; and an output unit that outputs the selected output target.

BRIEF DESCRIPTION OF THE DRAWINGS

Exemplary embodiments of the invention will be described in detail based on the following figures, wherein.

DETAILED DESCRIPTION

Exemplary embodiments for implementing the invention will be described.

Figure 1:
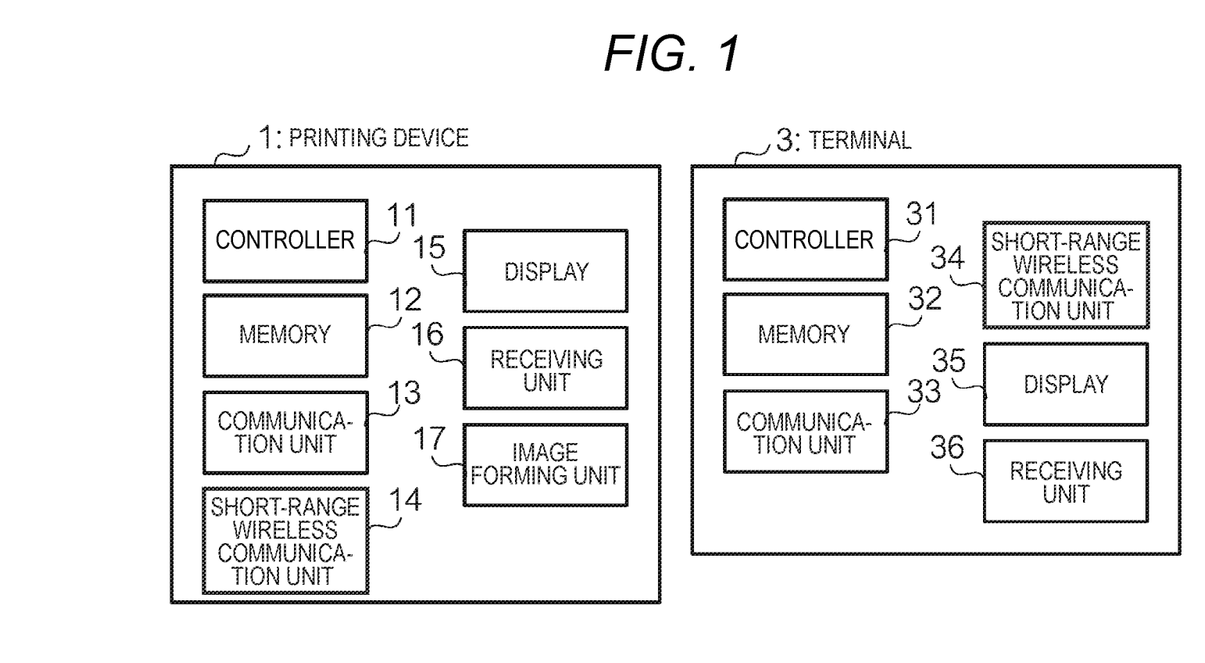
FIG. 1 is a diagram illustrating hardware configurations of a printing device 1 and a terminal 3.

FIG. 1 is a diagram illustrating hardware configurations of a printing device 1 and a terminal 3. The printing device 1 is an apparatus that prints an image based on print data. The terminal 3 is, for instance, a smart phone, a tablet, or a notebook type personal computer.

Next, the hardware configuration of the printing device 1 will be described. The controller 11 includes an arithmetic device such as a central processing unit (CPU) and a storage device such as a read-only memory (ROM) or a random access memory (RAM). The ROM stores a firmware that describes an activation sequence of hardware or an operating system (OS). The RAM stores data when the CPU executes an arithmetic operation. The RAM stores data when the CPU executes an arithmetic operation. The memory 12 includes, for instance, a hard disk storage device and stores the OS or application programs.

The communication unit 13 is a communication interface (I/F) that connects the printing device 1 to a local area network (LAN). An access point of a wireless LAN is provided in the LAN. The communication unit 13 performs communication with a communication unit 33 of the terminal 3 to be described below via an access point.

A short range wireless communication unit 14 is, for instance, a reader/writer that performs communication with a contactless integrated circuit (IC) card included in a short range wireless communication unit of the terminal 3 and performs short range wireless communication with the terminal 3. The short range wireless communication unit 14 periodically transmits an inquiry signal. Thus, when a user holds the terminal 3 up to the printing device 1, a short range wireless communication unit 34 receives the inquiry signal. Then, the printing device 1 and the terminal 3 start short range wireless communication, taking the reception of the inquiry signal as an opportunity.

A display 15 is, for instance, a liquid crystal display device and displays a screen so that the user can operate the printing device 1. The reception unit 16 is, for instance, a touch panel provided to cover a display surface of the display 15 and receives an operation of the user on the printing device 1. An image forming unit 17 forms an image on a recording medium based on raster data. The configuration of the image forming unit 17 may be any one of an electrographic system, an inkjet type, and the like.

Next, the hardware configuration of the terminal 3 will be described. A controller 31 includes an arithmetic device such as a CPU and a storage device such as a ROM or a RAM. The ROM stores a firmware that describes an activation sequence of hardware or an operating system (OS). The RAM stores data when the CPU executes an arithmetic operation. The memory 32 includes, for instance, a nonvolatile semiconductor memory and stores the OS or application programs.

The communication unit 33 is a communication I/F that connects the terminal 3 to the access point of the wireless LAN and performs communication with the communication unit 13 of the printing device 1 via an access point.

The short range wireless communication unit 34 is, for instance, a slot on which a contactless IC card is mounted and performs short range wireless communication with the printing device 1. A communication I/F connecting the terminal 3 to a communication network for mobile phones and a speaker, a microphone, a voice processing circuit, and the like for calling may be included in the terminal 3.

A display 35 is, for instance, a liquid crystal display device and displays a screen so that the user can operate the portable terminal 3. A receiving unit 36 is, for instance, a touch panel provided to cover a display surface of the display 35 and receives an operation of the user on the terminal 3.

Figure 2:
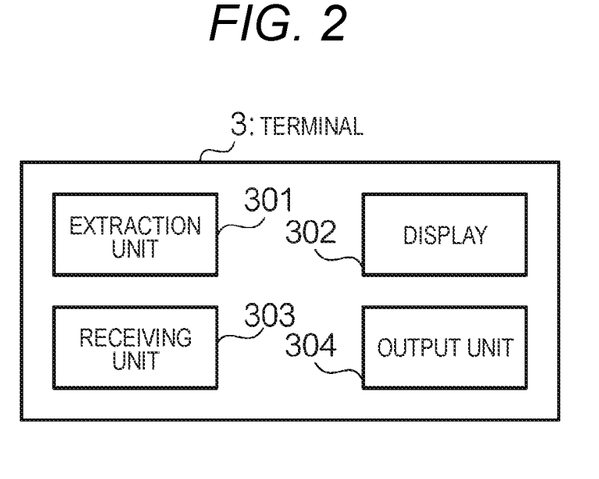
FIG. 2 is a diagram illustrating a functional configuration of the terminal 3.

FIG. 2 is a diagram illustrating a functional configuration of the terminal 3. The terminal 3 includes an extraction unit 301 that extracts output target candidates from plural files included in the terminal 3, a display 302 that displays the extracted candidates, a receiving unit 303 that receives a selection of an output target from the displayed candidates, and an output unit 304 that outputs the selected output target. The extraction unit 301 gives priorities to the plural files and extracts the output target candidates based on the priorities. Hereinafter, specific instances of the functions will be described.

(1) First Exemplary Embodiment

Figure 3:
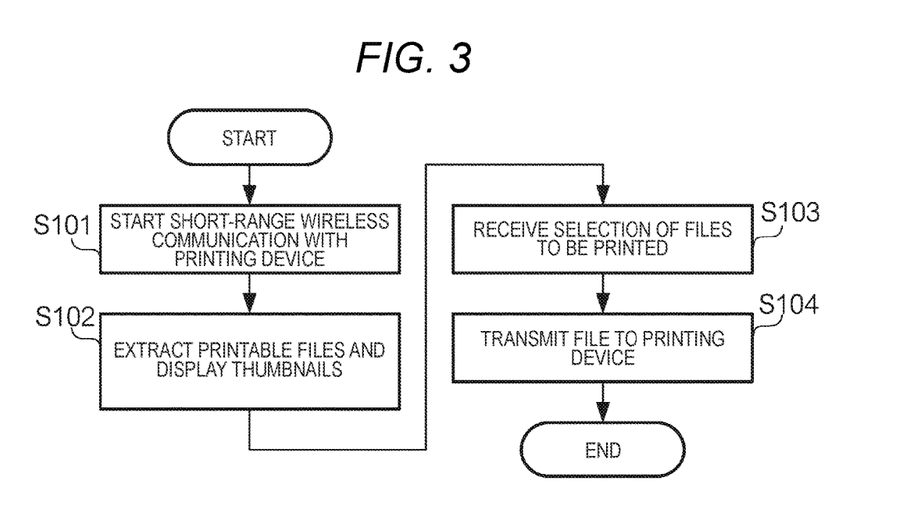
FIG. 3 is a flowchart illustrating a sequence of processes performed by the terminal 3.

FIG. 3 is a flowchart illustrating a sequence of processes performed by the terminal 3. A first exemplary embodiment is an instance in which priorities are given based on date and time information of files. The controller 31 of the terminal 3 performs the following processes according to an application program installed in the terminal 3.

<Step S101>

When a user holds the terminal 3 up to the printing device 1, the terminal 3 starts short range wireless communication with the printing device 1.

<Step S102>

The controller 31 (which is an instance of the extraction unit 301 and the display 302) extracts printable files and displays as the files as thumbnails. Specifically, the step is performed as follows.

First, the controller 31 extracts printable files. For instance, the controller 31 extracts displayable or printable files such as document files of pdf or the like or image files of jpg or the like. On the other hand, exe files or music files are not extracted.

Next, the controller 31 gives the priorities to the plural files based on date and time information of the plural files. For instance, the controller 31 gives higher priorities as date and time of the files are newer. The information of the date and time is, for instance, date and time at which the terminal obtains the files.

Next, the controller 31 arranges the files in a predefined direction in order from the files with the higher priorities and displays the files as thumbnails. The number of displayed files depends on the size of a display surface of the terminal 3. From the viewpoint of visibility, the number of files is set to 10 or less, for instance, in the case of a smart phone. Since files desired to be printed may not be specified only with file names, the files are preferably displayed as the thumbnails. However, the files may be displayed only with the file names.

<Step S103>

The controller 31 (which is an instance of the receiving unit 303) receives a selection of the files to be printed.

<Step S104>

The controller 31 (which is an instance of the output unit 304) transmits the selected file to the printing device 1. The printing device 1 prints the received file. In the transmission of the file, a wireless LAN may be used or short range wireless communication may be used.

The first exemplary embodiment may be modified as follows.

The date and time information may be date and time at which the terminal receives or transmits mails to which the files are attached. In this case, the controller 31 may give lower priorities to the files attached to the unread mails than the files attached to the read mails among the files attached to the received mails.

The date and time information may be date and time at which the terminal generates the files. In this case, the controller 31 may give the higher priorities to the files updated after the generation than the files not updated after the generation among the generated files.

The date and time information may be date and time at which the files are finally browsed.

(2) Second Exemplary Embodiment

Figure 4:
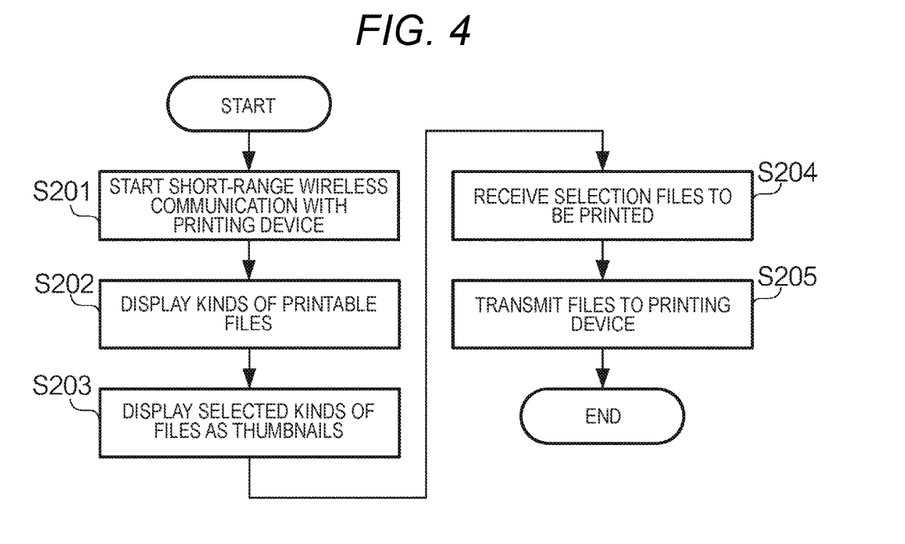
FIG. 4 is a flowchart illustrating a sequence of processes performed by the terminal 3.

FIG. 4 is a flowchart illustrating a sequence of processes performed by the terminal 3. A second exemplary embodiment is an instance in which priorities are given mainly based on kinds of files.

<Step S201>

When a user holds the terminal 3 up to the printing device 1, the terminal 3 starts short range wireless communication with the printing device 1.

<Step S202>

The controller 31 displays icon indicating the kinds of files. Specifically, the step is performed as follows.

First, the controller 31 classifies the printable files into the kinds of files such as captured photos, mails, and files attached to mails.

Next, the controller 31 gives priorities the plural files based on the kinds of plural files. For instance, the controller 31 gives higher priorities as the files are the kinds of files which are highly likely to be printed. The files which are highly likely to be printed are, for instance, document files. The controller 31 gives the higher priorities to the document files than other kinds of files. The document files are, for instance, files with extensions of txt, doc, and pdf. The controller 31 gives the higher priorities to the files with such extensions than files with other extensions.

Figure 5:
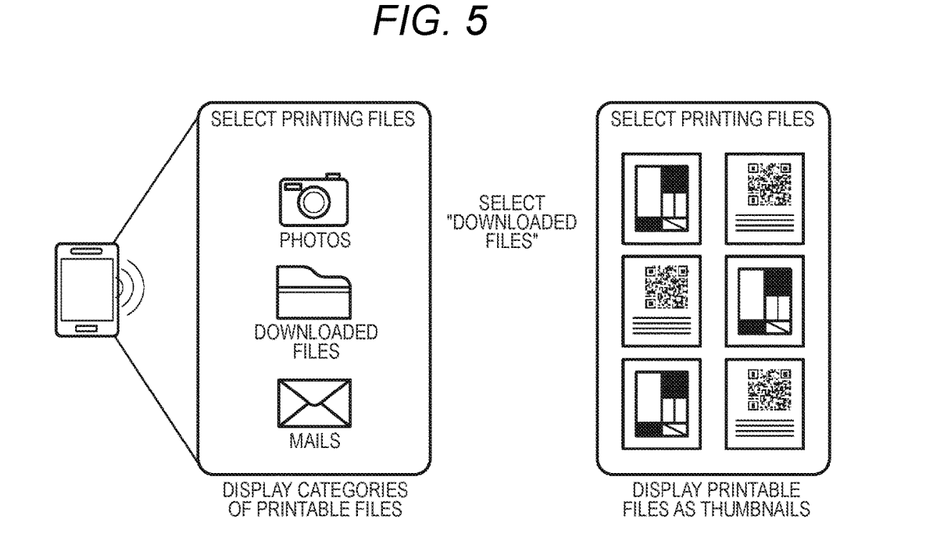
FIG. 5 is a diagram illustrating a display instance of output target candidates.

FIG. 5 is a diagram illustrating a display instance of output target candidates. The controller 31 arranges icons in a predefined direction in order from the kinds of icons with the higher priorities and displays the icons and receives a selection of the kinds of files to be printed.

<Step S203>

The controller 31 arranges the files in the predefined direction in order from the files with the higher priorities and displays the files as thumbnails (see FIG. 5).

<Step S204>

The controller 31 receives a selection of the files to be printed.

<Step S205>

The controller 31 transmits the selected files to the printing device 1. The printing device 1 prints the received file.

The second exemplary embodiment may be modified as follows.

The controller 31 may give the higher priorities to image files than other kinds of files. In this case, for instance, the controller 31 may give the higher priorities to photo image files than other image files. The photo image files are, for instance, files with extensions of jpg, bmp, and tiff. The controller 31 may give the higher priorities to the files with such extensions than files with other extensions.

The controller 31 may give lower priorities as the files are the kinds of files which are less likely to be printed. For instance, the controller 31 may give lower priorities to files which are neither document files nor still image files than document files and still image files. Specifically, the controller 31 may give the lower priorities to files with extensions belonging to neither documents nor still images than files with extensions belonging to documents or still images. More specifically, the controller 31 may give the lower priorities to execution files, audio files, moving-image files, and compressed files than other files.

More specifically, the controller 31 may give the lower priorities to execution files, audio files, moving-image files, and compressed files than other files.

(3) Third Exemplary Embodiment

Figure 6:
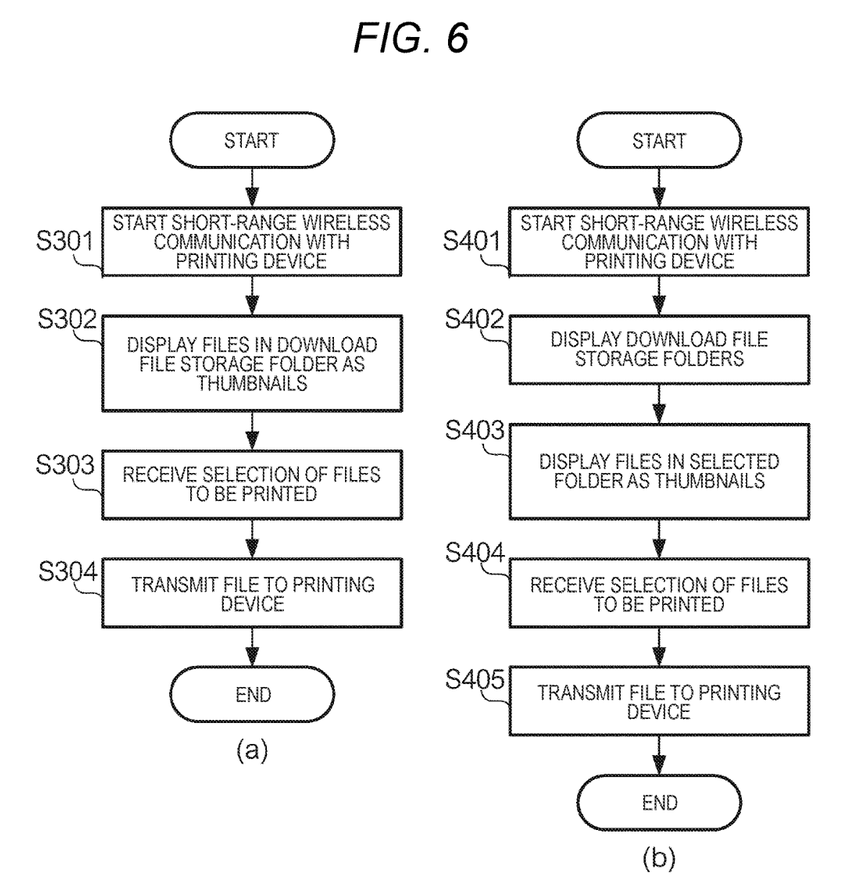
FIG. 6 is a flowchart illustrating a sequence of processes performed by the terminal 3.

FIG. 6 is a flowchart illustrating a sequence of processes performed by the terminal 3. A third exemplary embodiment is an instance in which only downloaded files are set as targets. A sequence is different between a case in which the number of download file storage folders is 1 and a case in which the number of download file storage folders is plural.

(a) Case in which Number of Download File Storage Folders is 1

<Step S301>

When a user holds the terminal 3 up to the printing device 1, the terminal 3 starts short range wireless communication with the printing device 1.

<Step S302>

The controller 31 arranges files in a download file storage folder in a predefined direction in order from the files with the higher priorities and displays the files as thumbnails.

<Step S303>

The controller 31 receives a selection of the files to be printed.

<Step S304>

The controller 31 transmits the selected files to the printing device 1. The printing device 1 prints the received file.

(b) Case in Which Number of Download File Storage Folders is Plural

<Step S401>

When a user holds the terminal 3 up to the printing device 1, the terminal 3 starts short range wireless communication with the printing device 1.

<Step S402>

The controller 31 displays icons indicating plural download file storage folders. The controller 31 receives a selection of an icon of the download file storage folder to be printed.

<Step S403>

The controller 31 arranges files in the selected download file storage folder in a predefined direction in order from the files with the higher priorities and displays the files as thumbnails (see FIG. 5).

<Step S404>

The controller 31 receives a selection of the files to be printed.

<Step S405>

The controller 31 transmits the selected files to the printing device 1. The printing device 1 prints the received file.

(4) Fourth Exemplary Embodiment

Figure 7:
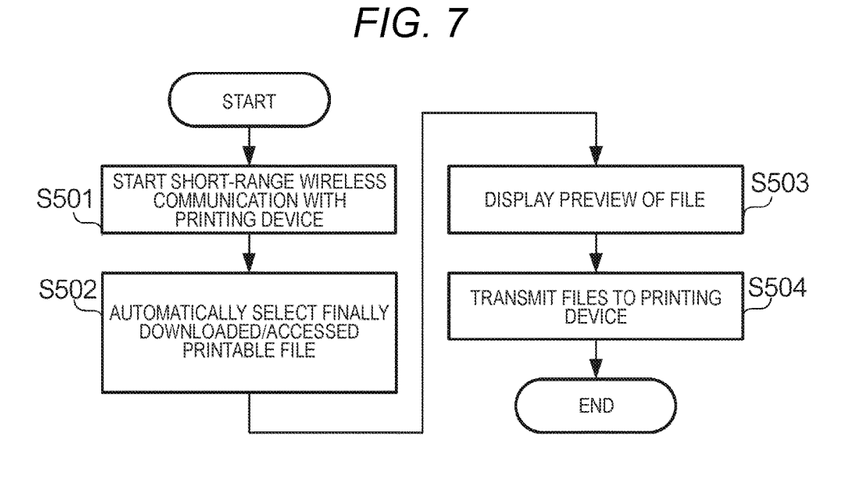
FIG. 7 is a flowchart illustrating a sequence of processes performed by the terminal 3.

FIG. 7 is a flowchart illustrating a sequence of processes performed by the terminal 3. A fourth exemplary embodiment is an instance in which either a finally downloaded printable file or a finally accessed printable file is automatically selected.

<Step S501>

When a user holds the terminal 3 up to the printing device 1, the terminal 3 starts short range wireless communication with the printing device 1.

<Step S502>

The controller 31 automatically selects either the finally downloaded printable file or the finally accessed printable file.

<Step S503>

The controller 31 displays a preview of the selected file. The user performs a pre-decided operation when the file of which the preview is displayed is printed. This operation is, for instance, an operation of a user touching an OK button or the like, a display region of the preview, or the like.

<Step S504>

The controller 31 transmits the selected files to the printing device 1. The printing device 1 prints the received file.

(5) Fifth Exemplary Embodiment

Figure 8:
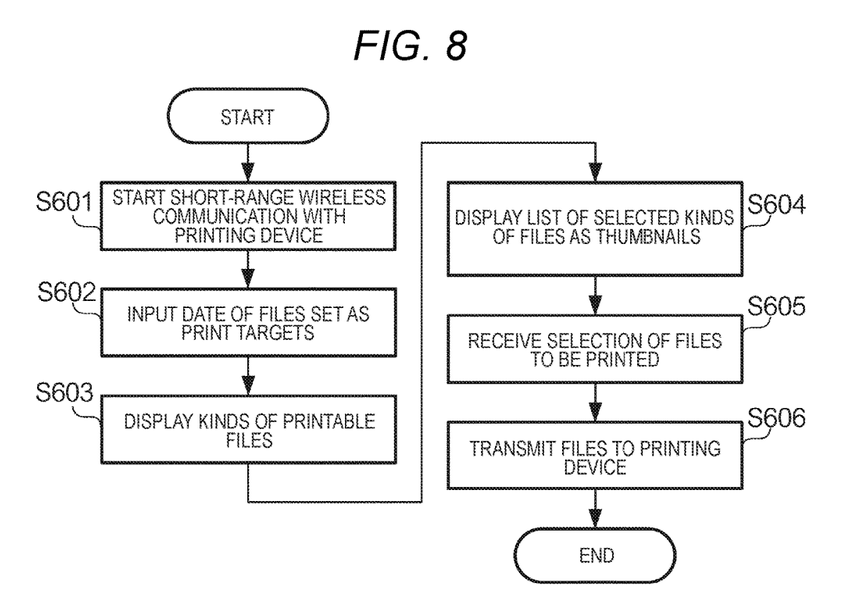
FIG. 8 is a flowchart illustrating a sequence of processes performed by the terminal 3.

FIG. 8 is a flowchart illustrating a sequence of processes performed by the terminal 3. A fifth exemplary embodiment is an instance in which files extracted as printing targets are limited by a date. When even a user who does not well know operations or file formats of the terminal remembers a date (a date in which a photo is captured, a date in which a mail is received, or a range of the date) of a target file, files to be printed are extracted from the date.

<Step S601>

When a user holds the terminal 3 up to the printing device 1, the terminal 3 starts short range wireless communication with the printing device 1.

<Step S602>

The controller 31 receives a designation of the date of files or a range of the date of files set as printing targets.

<Step S603>

The controller 31 displays kinds of printable files corresponding to the designated date or the designated range of the date. Specifically, the files are categorized into downloaded files, captured photos, mails, files attached to mails and icons indicating the categories are displayed. The user selects the kinds of icons to be printed.

<Step S604>

The controller 31 arranges the selected kinds of files in a predefined direction in order from the files with the higher priorities and displays the files as thumbnails (see FIG. 5).

<Step S605>

The controller 31 receives a selection of the files to be printed.

<Step S606>

The controller 31 transmits the selected files to the printing device 1. The printing device 1 prints the received file.

The foregoing exemplary embodiments may be modified as in the following modification examples.

Modification Example 1

In the foregoing exemplary embodiments, various methods of giving the priorities in the extraction of output target candidates have been exemplified, but two or more methods may be combined. The following modification examples may be combined with the methods according to the foregoing exemplary embodiments.

Modification Example 2

The present modification example is an instance in which priorities are given mainly to an application program associated with files.

The controller 31 may give the priorities to the plural files based on an application program associated with the plural files.

For instance, the controller 31 gives higher priorities as the files are associated with an application by which there is a higher possibility of printing being performed. Specifically, the controller 31 may give the higher priorities to the files associated with an application program performing at least one of file generation and processing than the files associated with an application program performing no file generation and processing. Alternatively, the controller 31 may give the higher priorities to the files associated with the application program handling at least one of a document and a still image than the files associated with an application program handling no document and still image. Alternatively, the controller 31 may give the higher priorities to the files associated with an application program in which the time elapsed from final activation is less than a threshold value than the files associated with an application program in which the time elapsed from the final activation is equal to or greater than the threshold value. Alternatively, the controller 31 may give the higher priorities to the files associated with an application program of which an activation frequency is equal to or greater than a threshold value than the files associated with an application program of which the activation frequency is less than the threshold value.

The controller 31 may give lower priorities as the files are associated with an application program by which there is a lower possibility of printing being performed. Specifically, the controller 31 may give the lower priorities to the files associated with the application program performing at least one of file generation and processing than the files associated with the application program performing no file generation and processing. Alternatively, the controller 31 may give the lower priorities to the files associated with the application program handling no document and still image than the files associated with the application program handling at least one of a document and a still image. Alternatively, the controller 31 may give the lower priorities to the files associated with the application program in which the time elapsed from final activation is equal to or greater than the threshold value than the files associated with the application program in which the time elapsed from the final activation is less than the threshold value. Alternatively, the controller 31 may give the lower priorities to the files associated with an application program of which the activation frequency is less than the threshold value than the files associated with an application program of which the activation frequency is equal to or greater than the threshold value.

Modification Example 3

The present modification example is an instance in which priorities are given mainly based on a state of the terminal.

The controller 31 may give the priorities to plural files based on the state of the terminal. For instance, the controller 31 may give the priorities to the plural files based on a posture of the terminal. Specifically, the controller 31 may give higher priorities to the files for which the longitudinal direction of a display surface of the terminal is same as the longitudinal direction of an image of each file than the files for which the longitudinal direction of the display surface of the terminal is not same as the longitudinal direction of the image of each file. Here, the longitudinal direction is a direction in which the long side of the display surface or the image extends when the display surface or the image is rectangular.

Alternatively, the controller 31 may give the higher priorities to the files associated with an application program for which the longitudinal direction of a display surface of the terminal is same as the longitudinal direction of an image of an application program than the files associated with an application program for which the longitudinal direction of the display surface of the terminal is not same as the longitudinal direction of the image of the application program. Here, the image of the application program is, for instance, a window displayed when the application program is executed.

The controller 31 may give the priorities to the plural files based on an application program which is being executed in the terminal. For instance, the controller 31 may give the higher priorities to the files associated with the application program is being executed in the terminal than files not associated with the application program is being executed in the terminal.

The controller 31 may give the priorities the plural files based on a login state of the terminal. For instance, the controller 31 may set the files associated with a user logging in the terminal as targets and give the priorities to the files associated according to the foregoing method.

Modification Example 4

Depending on an OS, an application program in which files are stored to be integrated with an application program associated with files is supplied in some cases. In this case, the controller 31 may extract an application program associated with printable files as an output target candidate. In this case, the controller 31 may give the higher priorities with reference to an activation history of the application program as the date and time of the activation is newer.

Modification Example 5

A mail application program in which electronic mails are stored to be integrated with a mail application program is supplied in some cases. In this case, the user may activate the mail application program and may select and output an output target mail or an attached file.

Modification Example 6

In the case of a mail application program stored in a cloud storage, a user may activate the mail application program, select an output target mail or an attached file, and download and output the selected mail or attached file to the terminal 3. After the mail or the attached file is output, it is desirable to delete files attached to downloaded mails. However, the files attached to the downloaded mail may remain.

Modification Example 7

In the case of an application program for which files are stored in a cloud storage, the controller 31 may determine whether the application program is used based on an activation history, extract the used application program, and display the kind of application program. The user may select and activate an output target application program from the displayed kind of application program, may select printing target candidates from the files stored in the cloud storage, and may download and output the selected candidates to the terminal. After the candidates are output, it is desirable to delete downloaded files. However, the downloaded files may remain.

Modification Example 8

The functions exemplified in the foregoing exemplary embodiments and modification examples are functions for which the user is mainly assumed to be inexperienced in an operation on the terminal. Accordingly, when the user holds the terminal 3 up to the printing device 1, the controller 31 may determine whether the terminal has setting or specification for the user inexperienced in the operation on the terminal 3. When the terminal has the setting or specification, the controller 31 may perform the foregoing processes. The user may be permitted to determine whether to perform the foregoing processes.

Modification Example 9

In the foregoing exemplary embodiments, the configuration in which the files are transmitted to the printing device 1 has been exemplified as an instance in which the files are output, but the invention may be applied to transmission or transfer of files to an electronic apparatus other than the printing device 1.

Modification Example 10

In the foregoing exemplary embodiments, the instance in which the extraction unit 301 is included in the terminal 3 has been described, but the function of the extraction unit 301 may be configured to be realized by an external apparatus. For instance, in regard to files stored in a cloud storage, a cloud server may be configured to extract output target candidates.

Some or all of the foregoing functions may be mounted as hardware circuits on the terminal 3. Application programs realizing the foregoing functions may be recorded on a computer-readable recording medium such as an optical recording medium or a semiconductor memory for supply. The application programs may be supplied with electrical communication lines.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A terminal comprising:
at least one processor configured to:
extract output target candidate files from a plurality of files included in the terminal;
give display priorities to the plurality of files included in the terminal based on at least one of: (i) a use frequency, corresponding to a frequency of activation of an application program associated with the respective file, (ii) whether the application program associated with the respective file is being executed or not being executed, and (iii) whether the application program associated with the respective file is in a login state or not in a login state;
control a display to display one or more of the extracted output target candidate files based on the given display priorities;
receive a selection of an output target candidate file from the one or more displayed output target candidate files; and
output the selected output target candidate file.

2. The terminal according to claim 1, wherein the at least one processor is further configured to: give display priorities to the plurality of files based on the state of the terminal.

3. The terminal according to claim 2, wherein the at least one processor is further configured to: give display priorities to the plurality of files based on a posture of the terminal.

4. The terminal according to claim 3, wherein the at least one processor is further configured to: give higher display priorities to files for which a longitudinal direction of a display surface of the terminal is the same as a longitudinal direction of an image of the respective file than another file for which the longitudinal direction of the display surface of the terminal is not the same as the longitudinal direction of the image of the other respective file.

5. The terminal according to claim 1, wherein the processor is further configured to give display priorities to the plurality of files based on whether the application program associated with the respective file is the application program being executed in the terminal or not.

6. The terminal according to claim 1, wherein the processor is further configured to: give display priorities to the plurality of files based on the login state of the application program associated with the respective file.

7. The terminal according to claim 1, wherein the processor is further configured to: give a lower display priority to files associated with application programs of which a use frequency, corresponding to an activation frequency, in the terminal is low than the display priority given to files associated with application programs of which a use frequency is high.

8. The terminal according to claim 1, wherein the processor is further configured to: give a lower display priority to files associated with application programs which are not being executed in the terminal than the display priority given to files associated with application programs which are being executed in the terminal.

9. The terminal according to claim 1, wherein the processor is further configured to: give a lower display priority to files associated with application programs that are not in a login state than the display priority given to files associated with application programs that are in a login state.

10. The terminal according to claim 1, wherein the processor is further configured to: give a lower display priority to files associated with application programs of which date and time of final activation are older than the display priority given to files associated with application programs of which date and time of final activation are new.

11. A terminal comprising:
at least one processor configured to:
extract output target candidate files from a plurality of files included in the terminal;
give display priorities to the plurality of files included in the terminal based on activation information of the application program associated with the respective file; and
control a display to display, based on the given display priorities, one or more of the extracted output target candidate files based on the given display priorities.

* * * * *